United States Patent  [15] 3,698,227
Allen  [45] Oct. 17, 1972

[54] EXTRUSION PRESS AND METHOD
[72] Inventor: Herbert Allen, Houston, Tex.
[73] Assignee: Cameron Iron Works, Inc., Houston, Tex.
[22] Filed: Sept. 14, 1970
[21] Appl. No.: 71,872

[52] U.S. Cl. ..................................... 72/263, 72/272
[51] Int. Cl. ........................ B21c 23/00, B21c 27/00
[58] Field of Search ....................... 72/263, 272, 270

[56] References Cited

UNITED STATES PATENTS 2,860,775   11/1958   Brauchler ..................... 72/272
2,860,775   11/1958   Brauchler ..................... 72/272

Primary Examiner—Charles W. Lanham
Assistant Examiner—R. M. Rogers
Attorney—Hyer, Eickenroht, Thompson & Turner

[57] ABSTRACT

The press includes a die assembly having a die and a horizontally split can. To load a preform of material to be extruded, the upper half of the can is moved upwardly far enough to permit the preform to be moved horizontally to a position between the two halves of the can and then downwardly into the lower half of the can. The upper half of the can is then moved back into engagement with the lower half to enclose the preform and confine it as the preform is extruded horizontally through the die assembly.

9 Claims, 3 Drawing Figures

Herbert Allen
INVENTOR.

BY Hyer Eickenroht,
Thompson & Turner
ATTORNEYS

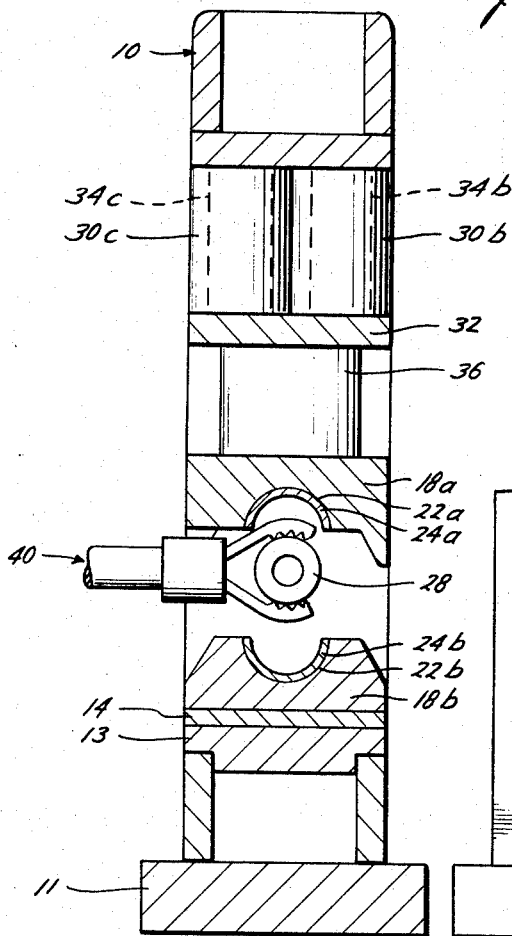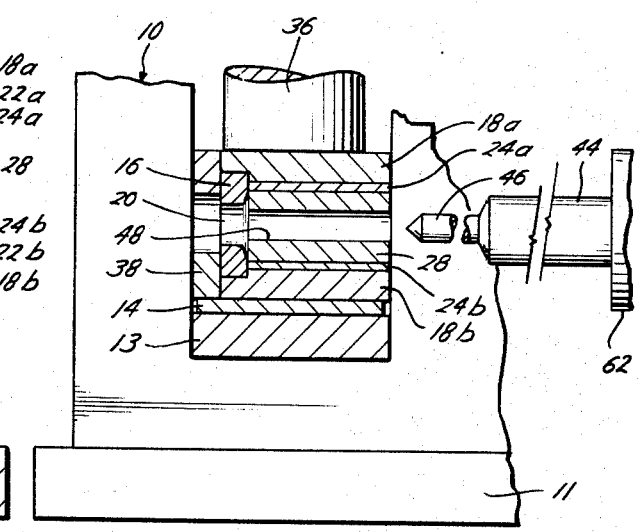

EXTRUSION PRESS AND METHOD

This invention relates to extrusion presses and to methods of operating the same.

During an extrusion process, the preform or blank of the material to be extruded is placed in a die assembly, which includes a die and a member known as a "can." The material is forced out of the can and through the throat of the die by a plunger that enters the can from one end and moves through the can toward the die, which is located at the other end. The can encloses the preform and confines the preform against movement laterally of the direction it is being forced by the plunger.

In a horizontal extrusion press, the preform is extruded in a horizontal direction from the can through the throat of the die. To load the preform into the can, it is moved horizontally into the can from one end. As it slides into place, it will tend to lie against the low side of the can and scrape the die lubricant from that side. This creates a problem because it leaves the low side with an insufficient amount of lubricant for the subsequent extrusion process. Another problem is created because some clearance must be provided between the preform and the inside of the can to permit the preform to be placed therein. The preform then, when in place, will lie against the bottom side of the can, but is spaced from the upper side by the amount of the clearance. Since the preform is hot, being at the extrusion temperature for the material from which it is made, it is constantly giving up heat, and the low side that is in direct contact with the can will give up heat faster than the upper side. This can cause the plasticity of the preform to be uneven, when the extruding process begins. This will result in uneven wear on the die, since the force required to extrude the material varies with its temperature. In addition, dimensional problems in the extrusion can result as well as structural variations.

There is another problem caused by the clearance between the can and the preform in horizontal extrusion presses. Initially, before the preform is deformed laterally to fill the can, there is an eccentricity between the preform and the throat of the die. This also can result in uneven loading on the die and premature wear.

It is an object of this invention to provide apparatus for and a method of extruding a preform horizontally wherein the preform can be loaded into the can of the die assembly without scraping the side of the can.

It is yet another object of this invention to provide apparatus and method for extruding a preform horizontally wherein the preform is in substantially uniform engagement with the can of the die assembly, when enclosed therein prior to the beginning of the extrusion process, so that the heat loss from the preform to the can will generally be uniform and the preform will be concentric with the die through which it is to be extruded.

It is another object of this invention to provide a method for loading a preform into the can portion of a die assembly by first moving the preform to a position between two spaced portions of the can and moving the two portions together to enclose the preform thereby avoiding any horizontal sliding movement of the preform along the sides of the can.

It is an additional object of this invention to provide a horizontal extrusion press wherein the can of the die assembly is split horizontally into two portions that can be moved apart to allow a preform to be positioned in one portion of the can with little, if any, relative sliding movement between the preform and the can portion, after which the two portions of the can can be brought together again to enclose the preform in the desired manner.

It is another object of this invention to provide an apparatus and method of loading a preform of material to be extruded into the can portion of an extrusion die assembly that has an inside diameter substantially equal to or slightly less than the outside diameter of the preform.

These and other objects, advantages, and features of this invention will be apparent to those skilled in the art from a consideration of this specification, including the attached drawings and appended claims.

The invention will now be described in connection with the attached drawings, in which:

FIG. 2 is a vertical sectional view of the press of FIG. 1 taken along line 2—2 of FIG. 1 with the can of the die assembly of the press in its open position receiving a preform of the material to be extruded; and FIG. 3 is a fragmentary sectional view of the die assembly at the beginning of the extruding process.

Figure 1:
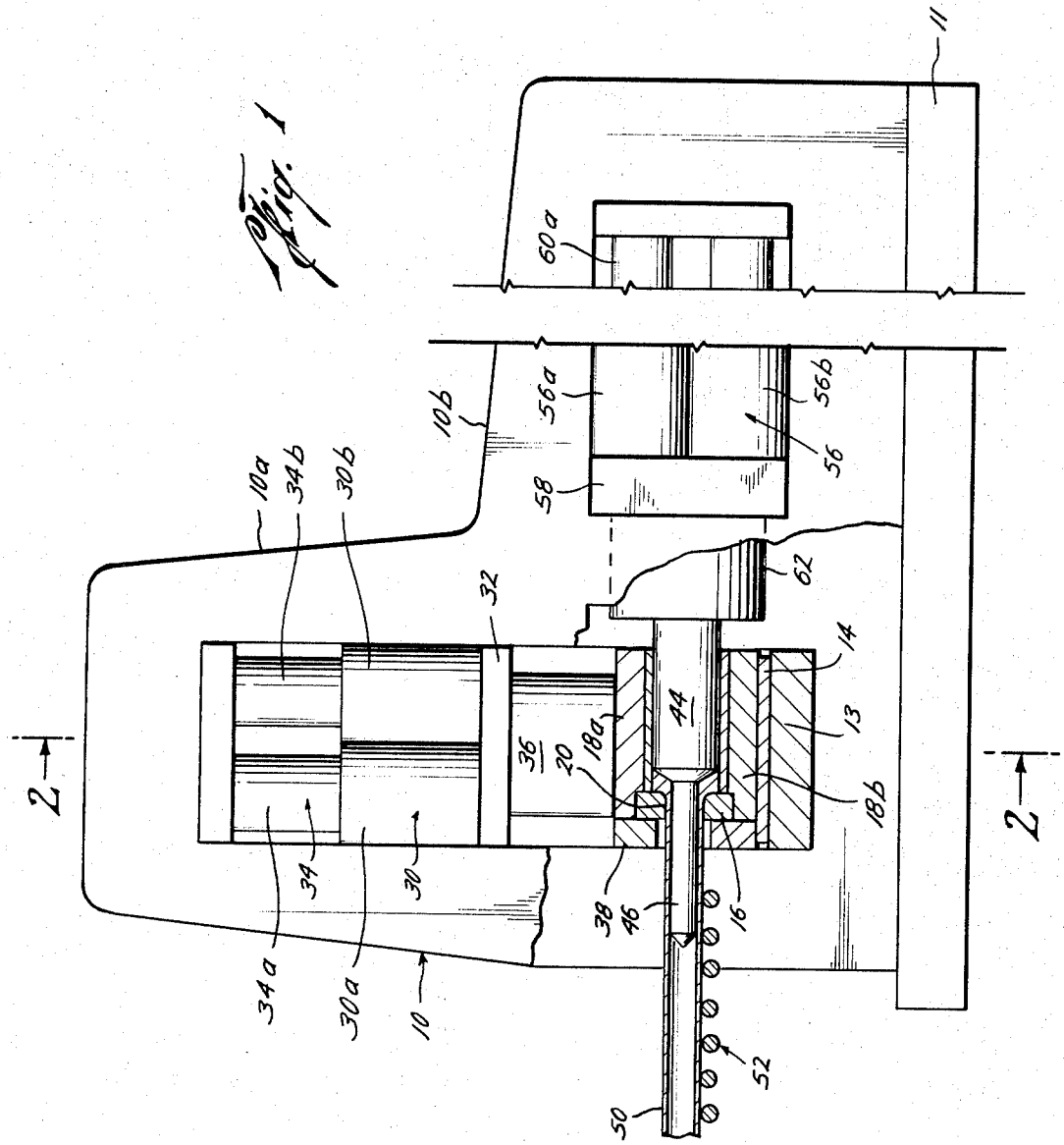
FIG. 1 is a side view, partially in elevation and partially in section, of the preferred embodiment of the press of this invention during an extrusion operation.

The press includes L-shaped frame 10 that has a vertical leg 10a and a horizontal leg 10b. The frame is supported on base 11 so that leg 10b is generally horizontal. A die assembly is supported by the frame and fixed platen 13. The assembly includes cross slide 14, which is movable laterally, as viewed in FIG. 2, to move the die assembly out of the press frame when the size of die, etc., is to be changed.

The die assembly also includes die 16 and a can portion that is divided into two portions, 18a and 18b. The die is an annular member having an opening therethrough that forms throat 20 through which material is extruded laterally to the left, as viewed in FIG. 1, when it is pushed out of the can. Fixed platen 38 supports die 16 against the horizontal force imposed on it during the extrusion process.

The can is split horizontally to form portions 18a and 18b. The two portions of the can have horizontally extending grooves 22a and 22b that are semi-circular in vertical cross section. The two grooves are aligned vertically so that when the two portions of the can are moved into engagement, they will form a circular cavity in the can. To reduce the wear on can portions 18a and 18b and to minimize the machining required to give the surfaces of grooves 22a and 22b the proper finish, semicircular liners 24a and 24b are located in the grooves and attached to the two portions. The liners can be removed and replaced when they become worn. They can also be replaced with other liners to provide cavities of different diameters to receive different sizes of preforms.

The can is split horizontally along the longitudinal axis of the circular cavity formed in the can by the grooves when the two can halves are in engagement with each other. In the embodiment shown, lower portion 18b of the can remains fixed relative to the frame of the press, and means are provided for moving upper portion 18a upwardly away from the lower portion to permit a preform, such as preform 28 of FIG. 2, to be moved into position to be loaded in the die assembly. In the embodiment shown, four hydraulic cylinders 30 are positioned in leg 10a of press frame 10 to so move upper portion 18a of the can. Only three of the cylinders, 30a, 30b, and 30c, are shown in the drawings, but from the drawings it should be clear that the cylinders are arranged in pairs in side-by-side relationship, the cylinder that is not shown being located behind cylinder 30a as shown in FIG. 1 and along side cylinder 30c. These cylinders are attached to moving platen 32. Rods 34 are attached to the upper end of press frame 10a and therefore are fixed relative to the frame. Pistons (not shown) are located in the cylinders and attached to the rods in the conventional manner so that hydraulic fluid on one side or the other of the pistons will cause the cylinder and the attached movable platen 32 to move up or down relative to leg 10a of the frame. Upper portion 18a of the can is attached to movable platen 32 by platen extension 36. Means (not shown) are provided to guide platen 32 as it moves vertically relative to the frame.

Thus, cylinders 30 will move can portion 18a upwardly away from lower portion 18b to the position shown in FIG. 2, when it is time to load preform 28 into the can. This is done by a manipulator or the like, indicated generally by the number 40. The manipulator moves preform 28 horizontally to a position between the upper and lower portions of the can and then gently (preferably) places preform 28 in the portion of the cavity formed by liner half 24b. The manipulator is then removed, and hydraulic cylinders 30 move upper portion 18a of the can downwardly into engagement with the lower portion, as shown in FIG. 3. Thus, the preform is loaded in the can with little, if any, horizontal sliding movement of the preform relative to the can, which as explained above, is detrimental to the lubricant with which the inside of the can is coated before each extrusion is made.

Also, preferably the diameter of the cavity formed by semi-circular liners 24a and 24b is just equal to or slightly less than the outside diameter of preform 28. In this way, when the two portions of the can are brought together by hydraulic cylinders 30, the preform will substantially fill the cavity in the can and in fact usually be slightly compressed and elongated by the bringing together of the two portions. This ensures that the cavity is in intimate and generally uniform contact with the preform and that the preform is centered relative to throat opening 20 through die 16 before the preform is extruded.

To extrude the preform through the throat of die 16, plunger 44 is moved horizontally through the can to push the preform out of the can to the left as viewed in FIGS. 1 and 3 of the drawings. As shown, the extrusion being made is tubular in shape. To form the tube, plunger 44 is equipped with mandrel 46, which extends through central opening 48 in the preform and throat 20 of die 16 before the plunger starts to push material through the throat. The diameter of mandrel 46 is designed to provide the extrusion with the desired wall thickness.

In FIG. 1 mandrel 44 has nearly completed the forming of tubular extrusion 50 which is moving laterally of the press. The extrusion is supported by rollers 52 as it leaves the die. The opening to throat 20 in the die is tapered to assist the flow of material into the throat and the forward portion of plunger 44 is also tapered so that at the end of the stroke of the plunger the material remaining in the can — and there will be some — will be sheared from the end of the extrusion. This allows the extrusion to be pulled on through the die. This cut-off portion of the preform that is not extruded out through the die is easily removed by opening up the can after plunger 44 has been retracted to the position shown in FIG. 3.

Plunger 44 is moved laterally during the extruding process by hydraulic cylinders 56. Four of these cylinders are used, in the embodiment shown. Only two, however, 56a and 56b, appear in the drawings. The general arrangement of these cylinders is similar to that of cylinders 30 in leg 10a of the frame. The cylinders are attached to movable platen 58. The cylinder rods 60 are attached to the right-hand side of leg 10b of the frame, and the cylinders and platen 58 do the moving. Plunger 44 is attached to movable platen 58 by connecting member 62. The connecting member and the movable platen are properly supported for horizontal movement relative to the press frame.

During the extruding process, some means must be provided to hold the can closed; for as plunger 44 moves laterally through the can, there will be an upward force on portion 18a of the can by the material being extruded. In the embodiment shown, cylinders 30 that are used to move the two portions of the can apart provide the downward force required to hold the can closed.

From the foregoing description of one embodiment of this invention by way of example, it will be seen that this invention is one well adapted to attain all of the ends and objects hereinabove set forth, together with other advantages which are obvious and which are inherent to the apparatus and structure.

The invention having been described, what is claimed is:

1. A press for forming an extrusion in a horizontal direction from a preform of the material to be extruded comprising a die assembly including a die and a can with a cavity into which a preform of the material to be extruded is to be positioned, said can being split longitudinally into two portions, means for moving the portions apart to permit the preform to be positioned between the two portions of the can assembly and for moving the two portions back into engagement to enclose the preform therebetween, and means to force the preform from the can horizontally through the die of the die assembly.

2. The press of claim 1 in which the can is split horizontally into an upper and a lower portion and the movable portion of the can is the upper portion.

3. The press of claim 1 in which the cavity in the can is cylindrical with a diameter equal to or slightly smaller than the diameter of the preform it is to receive so that the can will be substantially filled when the portions thereof are in engagement enclosing the preform and the preform will be substantially centered therein.

4. A horizontal press assembly for forming an extrusion by extruding material horizontally through a die, comprising a die assembly including a die and a can that is split horizontally into an upper and a lower portion, means for moving one of the two portions vertically away from the other to allow the material to be extruded to be moved horizontally to a position between the two vertically-spaced portions and then downwardly into position in the lower portion of the can and for moving the portions together to enclose the material so placed in the lower portion and to hold the two portions of the can together to help confine the material as it is forced horizontally from the can through the die of the die assembly.

5. The press assembly of claim 4 in which the upper portion of the can is movable vertically away from and toward the lower portion.

6. The press assembly of claim 4 in which the can has a generally cylindrical cavity with a diameter that is substantially equal to or slightly less than the largest diameter of the preform to cause the preform to be centered in the can when the two portions of the can are moved into engagement enclosing the preform.

7. A method of loading a preform of material to be extruded into the can portion of an extruding die assembly comprising the steps of opening up the can by moving one portion thereof away from the other, moving the preform to a position between the two portions, and moving the portions back into engagement.

8. A method of loading a preform of material to be extruded into the can portion of an extruding die assembly where the can portion includes upper and lower halves that are positioned in a horizontal press for extruding the material in a horizontal direction comprising moving the upper and lower halves of the can apart by moving at least one of the halves vertically away from the other half, moving the preform horizontally to a position between the two halves of the can, lowering the preform into position in the lower half of the can, and moving the two halves of the can together.

9. A method of extruding a preform of material in a horizontal direction from a can having an upper and a lower half, comprising the steps of moving the upper half of the can into which the preform is to be placed upwardly away from the lower half thereof, moving the preform horizontally to a position between the two halves of the can, lowering the preform into the lower half of the can, moving the upper half of the can downwardly into engagement with the lower half to close the can around the preform, and forcing the material of the preform horizontally out of the can and through a forming die to produce an extrusion of the desired shape.

* * * * *